United States Patent
Mishra et al.

(10) Patent No.: US 12,222,987 B1
(45) Date of Patent: Feb. 11, 2025

(54) PERFORMING A SEARCH USING A HYPERGRAPH

(71) Applicant: INTERNATIONAL BUSINESS MACHINES CORPORATION, Armonk, NY (US)

(72) Inventors: Lokesh Mishra, Bern (CH); Gerhard Ingmar Meijer, Zurich (CH); Peter Willem Jan Staar, Zurich (CH); Michele Dolfi, Zurich (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/467,151

(22) Filed: Sep. 14, 2023

(51) Int. Cl.
*G06F 16/00* (2019.01)
*G06F 16/31* (2019.01)
*G06F 16/33* (2019.01)
*G06F 16/901* (2019.01)

(52) U.S. Cl.
CPC ........ *G06F 16/9024* (2019.01); *G06F 16/316* (2019.01); *G06F 16/33* (2019.01)

(58) Field of Classification Search
CPC .... G06F 16/9024; G06F 16/33; G06F 16/316; G06F 16/90335
See application file for complete search history.

(56) References Cited

U.S. PATENT DOCUMENTS

| | | | |
|---|---|---|---|
| 9,710,544 B1 * | 7/2017 | Smith | G06F 16/36 |
| 11,145,683 B2 | 10/2021 | Rui et al. | |
| 2012/0137367 A1 * | 5/2012 | Dupont | G06F 21/00 726/25 |

(Continued)

FOREIGN PATENT DOCUMENTS

| | | | | |
|---|---|---|---|---|
| CN | 104216934 A | 12/2014 | | |
| CN | 111708897 A | 9/2020 | | |
| CN | 112417219 A | 2/2021 | | |
| CN | 114065758 A | 2/2022 | | |
| CN | 115423076 A | 12/2022 | | |
| WO | WO-2015169029 A1 * | 11/2015 | ............. | G06F 17/30 |

OTHER PUBLICATIONS

J. Payne, "Deep Hyperedges: a Framework for Transductive and Indicutive Learning on Hypergraphs", arXiv:1910.02633v1, Oct. 7, 2019, 9 pp.

(Continued)

*Primary Examiner* — Syed H Hasan
(74) *Attorney, Agent, or Firm* — KONRAD, RAYNES, DAVDA & VICTOR LLP; Janaki K. Davda

(57) ABSTRACT

Provided are techniques for performing a search using a hypergraph. Entities are identified. A knowledge graph using the entities is generated, wherein nodes of the knowledge graph represent the entities and edges between the nodes represent pair-wise relationships, and wherein each of the edges carries an edge score that quantifies a degree of coherence between a pair of the entities. A hypergraph using the knowledge graph is generated, wherein nodes of the hypergraph represent the entities and hyperedges represent relationships between multiple entities, and wherein each of the hyperedges carries a hyperedge score that quantifies a degree of coherence between the multiple entities. A search request is received. A search result is generated using the hypergraph, wherein the search result comprises a set of coherently related entities. The search result is returned.

20 Claims, 9 Drawing Sheets

(56) References Cited

U.S. PATENT DOCUMENTS

| | | | |
|---|---|---|---|
| 2015/0356137 A1* | 12/2015 | Andros | G06F 16/2246 707/715 |
| 2016/0217376 A1 | 7/2016 | Ye et al. | |
| 2020/0057809 A1* | 2/2020 | Xu | G06F 18/23 |
| 2021/0050006 A1* | 2/2021 | Andreas | G06N 20/00 |
| 2022/0019622 A1 | 1/2022 | Meyerzon et al. | |
| 2022/0121939 A1 | 4/2022 | Evans et al. | |
| 2022/0179882 A1* | 6/2022 | Cervantes | G06N 5/025 |
| 2024/0070492 A1* | 2/2024 | Zhang | G06N 5/04 |

OTHER PUBLICATIONS

J. Huang, et al., DEER: Descriptive Knowledge Graph for Explaining Entity Relationships, arXiv:2205.10479v2, Oct. 20, 2022, 13 pp.

D. Georgiev, et al., "HEAT: Hyperedge Attention Networks," Transaction on Machine Learning Research, Sep. 5, 2022, (TMLR 2022) 17 pp., arxiv.2201.12113v2.

Xu, et al., "Knowledge graph embedding with entity attributes using hypergraph neural networks," Intelligent Data Analysis, vol. 26, No. 4, Jul. 11, 2022, 20 pp.

X. Sun, et al., "Multi-level Hyperedge Distillation for Social Linking Prediction on Sparsely Observed Networks," ACM, International World Wide Web Conference Committee, published under Creative Commons CC, 2021, 12 pp.

Mell, P. et al., "The NIST Definition of Cloud Computing (Draft)", Sep. 2011, Computer Security Division Information Technology Laboratory National Institute of Standards and Technology, Total 7 pp.

Mell, P. et al., "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

* cited by examiner

PERFORMING A SEARCH USING A HYPERGRAPH

BACKGROUND

Embodiments of the invention relate to performing a search using a hypergraph. Certain embodiments of the invention relate to predicting hyperedges of the hypergraph for coherent knowledge extraction.

Named entity recognition allows identifying entities (such as names of materials or cities, and physical characteristics such as temperature or population) from documents. For example, named entity recognition may identify a person, a birth date for the person, and a country of residence for the person from a document about that person.

SUMMARY

In accordance with certain embodiments, a computer-implemented method comprising operations is provided for performing a search using a hypergraph. In such embodiments, a knowledge graph using the entities is generated, wherein nodes of the knowledge graph represent the entities and edges between the nodes represent pair-wise relationships, and wherein each of the edges carries an edge score that quantifies a degree of coherence between a pair of the entities. A hypergraph using the knowledge graph is generated, wherein nodes of the hypergraph represent the entities and hyperedges represent relationships between multiple entities, and wherein each of the hyperedges carries a hyperedge score that quantifies a degree of coherence between the multiple entities. A search request is received. A search result is generated using the hypergraph, wherein the search result comprises a set of coherently related entities. The search result is returned.

In accordance with other embodiments, a computer program product comprising a computer readable storage medium having program code embodied therewith is provided, where the program code is executable by at least one processor to perform operations for performing a search using a hypergraph. In such embodiments, a knowledge graph using the entities is generated, wherein nodes of the knowledge graph represent the entities and edges between the nodes represent pair-wise relationships, and wherein each of the edges carries an edge score that quantifies a degree of coherence between a pair of the entities. A hypergraph using the knowledge graph is generated, wherein nodes of the hypergraph represent the entities and hyperedges represent relationships between multiple entities, and wherein each of the hyperedges carries a hyperedge score that quantifies a degree of coherence between the multiple entities. A search request is received. A search result is generated using the hypergraph, wherein the search result comprises a set of coherently related entities. The search result is returned.

In accordance with yet other embodiments, a computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations for performing a search using a hypergraph. In such embodiments, a knowledge graph using the entities is generated, wherein nodes of the knowledge graph represent the entities and edges between the nodes represent pair-wise relationships, and wherein each of the edges carries an edge score that quantifies a degree of coherence between a pair of the entities. A hypergraph using the knowledge graph is generated, wherein nodes of the hypergraph represent the entities and hyperedges represent relationships between multiple entities, and wherein each of the hyperedges carries a hyperedge score that quantifies a degree of coherence between the multiple entities. A search request is received. A search result is generated using the hypergraph, wherein the search result comprises a set of coherently related entities. The search result is returned.

BRIEF DESCRIPTION OF THE SEVERAL VIEWS OF THE DRAWINGS

Referring now to the drawings in which like reference numbers represent corresponding parts throughout.

DETAILED DESCRIPTION

Figure 1:
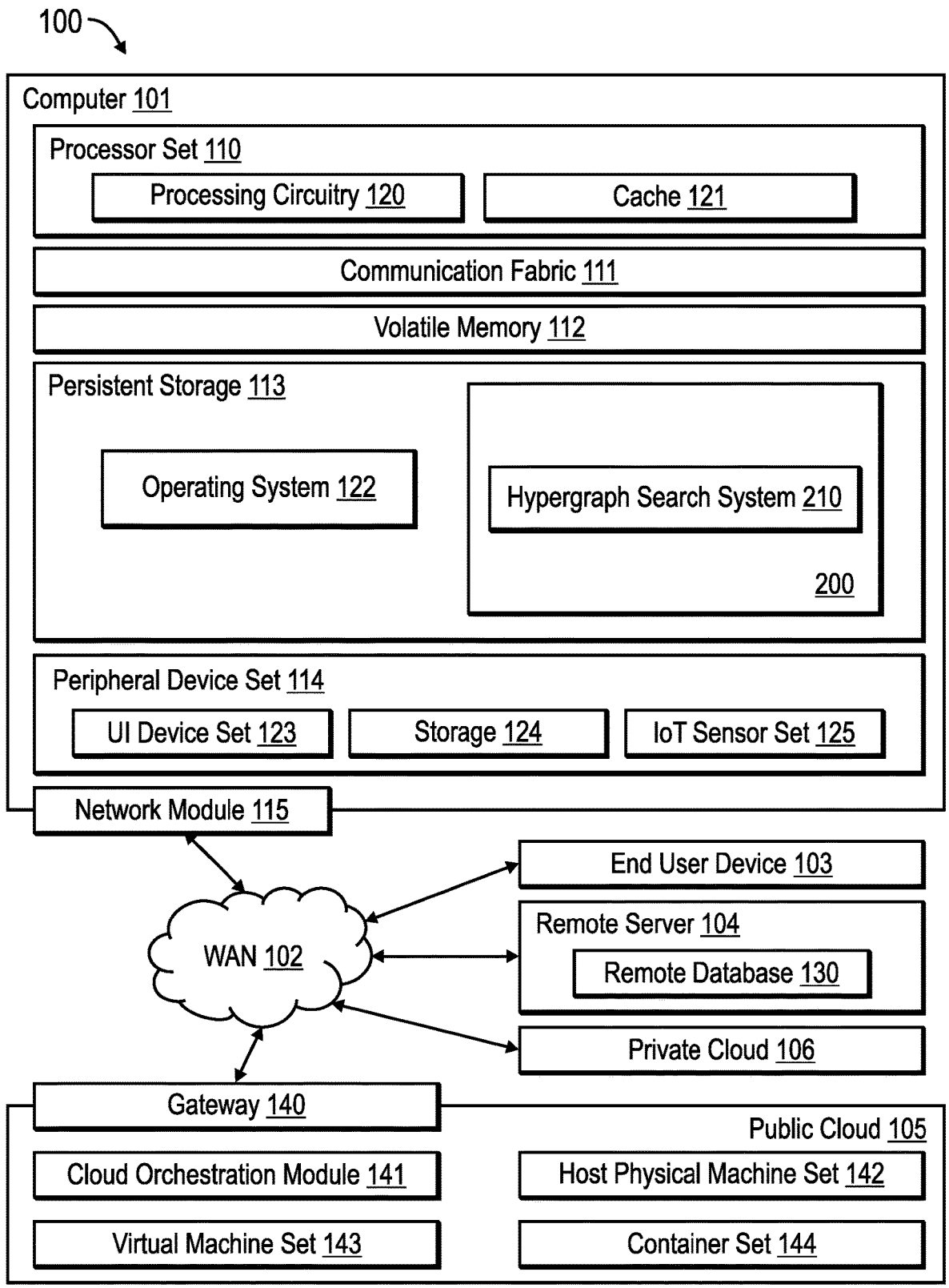
FIG. 1 illustrates a computing environment in accordance with certain embodiments.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The description herein provides examples of embodiments of the invention, and variations and substitutions may be made in other embodiments. Several examples will now be provided to clarify various aspects of the present disclosure:

Example 1: A computer-implemented method comprises identifying entities. The method further comprises generating a knowledge graph using the entities, wherein nodes of the knowledge graph represent the entities and edges between the nodes represent pair-wise relationships, and wherein each of the edges carries an edge score that quantifies a degree of coherence between a pair of the entities. The method further comprises generating a hypergraph using the knowledge graph, wherein nodes of the hypergraph represent the entities and hyperedges represent relationships between multiple entities, and wherein each of the hyperedges carries a hyperedge score that quantifies a degree of coherence between the multiple entities. The method further comprises receiving a search request. The method further comprises generating a search result using the hypergraph, wherein the search result comprises a set of coherently related entities. The method further comprises returning the search result.

Thus, embodiments advantageously generate a hypergraph from the knowledge graph to enable processing of the search request efficiently with the hypergraph. Embodiments also advantageously provide a hyperedge score for each hyperedge in the hypergraph that quantifies a degree of coherence between the multiple entities. Moreover, embodiments advantageously provide improved search results that comprise the set of coherently related entities.

Example 2: The limitations of any of Examples 1 and 3-7, wherein, for identifying the entities, the method further comprises performing named entity recognition to identify one or more of the entities in an information source. Thus, embodiments advantageously generate a set of entities that are in the information source automatically.

Example 3: The limitations of any of Examples 1-2 and 4-7, wherein the entities comprise one or more user-defined entities. Thus, embodiments advantageously enable a user to define entities that are used to generate the knowledge graph.

Example 4: The limitations of any of Examples 1-3 and 5-7, wherein the edge score of a particular edge of the edges comprises a probabilistic edge score that is a function of proximity between locations of the entities in an information source, a length of the information source, and an entity type. Thus, embodiments advantageously generate an edge score for each edge based on multiple factors of the proximity between locations of the entities in an information source, the length of the information source, and the entity type.

Example 5: The limitations of any of Examples 1-4 and 6-7, wherein the hyperedge score of a particular hyperedge of the hyperedges comprises a probabilistic hyperedge score that is based on the edge score of each edge that is part of the particular hyperedge. Thus, embodiments advantageously generate a hyperedge score for a hyperedge of the hypergraph based on the edge score for each edge in the knowledge graph.

Example 6: The limitations of any of Examples 1-5 and 7, wherein the set of coherent entities comprise entities of an information source that are located in different portions of the information source. Thus, embodiments advantageously identify the entities located in different portion of the information source that are coherently related.

Example 7: The limitations of any of Examples 1-6, wherein the method further comprises identifying the hypergraph from a plurality of hypergraphs based on the search request. Thus, embodiments advantageously select to the hypergraph from the plurality of hypergraphs that is most efficient to use for the search request.

Example 8: A computer program product, the computer program product comprising a computer readable storage medium having program instructions embodied therewith, the program instructions executable by a processor to cause the processor to perform a method according to any one of Examples 1-7.

Example 9: A computer system, comprising one or more processors, one or more computer-readable memories and one or more computer-readable, tangible storage devices and program instructions, stored on at least one of the one or more computer-readable, tangible storage devices for execution by at least one of the one or more processors via at least one of the one or more computer-readable memories, to perform a method according to any of Examples 1-7.

Example 10: The limitations of Examples 1, and 3, wherein embodiments advantageously enable a user to define entities that are used to generate the knowledge graph, in addition to the entities found in the information source. Thus, with embodiments, the knowledge graph is improved by including nodes for both the entities found in the information source and the user-defined entities.

Example 11: The limitations of Examples 1, 4, and 5, wherein embodiments advantageously generate a hyperedge score for a hyperedge of the hypergraph on various factors by generating the hyperedge score based on the edge score for each edge in the knowledge graph, which is generated based on the proximity between locations of the entities in an information source, the length of the information source, and the entity type.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 of contains an example of an environment for the execution of at least some of the computer code involved in performing the inventive methods, such as a hypergraph search system 210 of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The hypergraph search system 210 included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
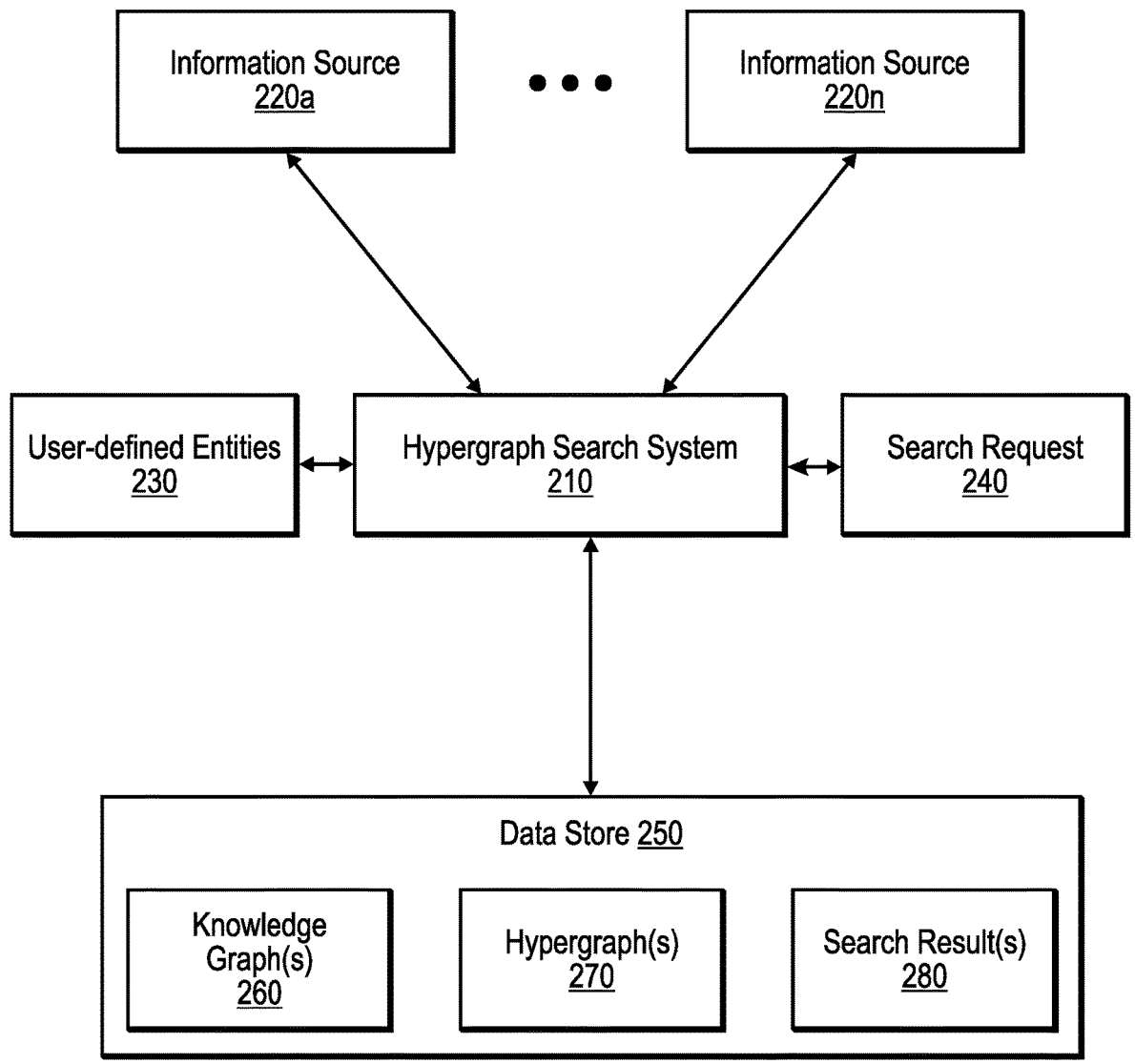
FIG. 2 illustrates, in a block diagram, a computing environment for a hypergraph search system in accordance with certain embodiments.

FIG. 2 illustrates, in a block diagram, a computing environment for a hypergraph search system 210 in accordance with certain embodiments. The hypergraph search system 210 receives data from one or more information sources 220a . . . 220n. In certain embodiments, the one or more information sources 220a . . . 220n have already been annotated, via named entity recognition, to generate a set of isolated entities. In other embodiments, the hypergraph search system 210 receives one or more information sources 220a . . . 220n that have not been annotated and uses named entity recognition to generate the set of isolated entities. The one or more information sources 220a . . . 220n may be documents, webpages, etc.

In certain embodiments, the hypergraph search system 210 retrieves (or receives) user-defined entities 230. The user-defined entities 230 are optional.

The hypergraph search system 210 is connected to a data store 250. The data store 250 stores one or more knowledge graphs 260, one or more hypergraphs 270, and one or more search results 280.

The hypergraph search system 210 uses the isolated entities to generate a knowledge graph 260. Then, the hypergraph search system 210 uses the knowledge graph 260 to generate a hypergraph 270.

The hypergraph search system 210 may then receive a search request 240, and the hypergraph search system 210 uses the hypergraph 270 to generate a search result 280.

In certain embodiments, if the user defines entities of interest before the knowledge graph 260 is built, then the hypergraph search system 210 represents the user-defined entities 230 with nodes in the knowledge graph 260. In certain embodiments, if the user defines entities of interest after the knowledge graph 260 is built, the hypergraph search system 210 creates new nodes in the knowledge graph 260 based on the user-defined entities 230. In certain embodiments, the hypergraph search system 210 uses the subject domain (identified using the search request 240) to determine which entities will be used for a particular knowledge graph 260.

Figure 3:
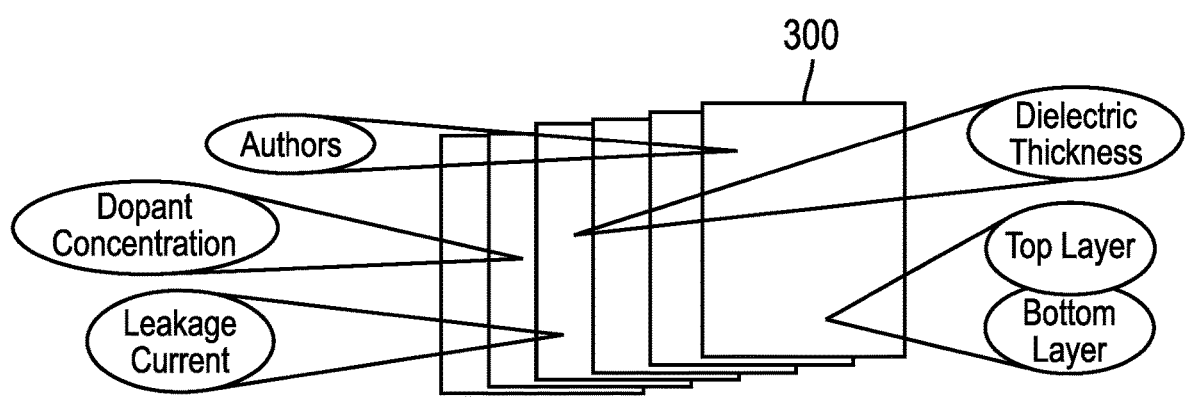
FIG. 3 illustrates an example of an information source in accordance with certain embodiments.

In certain embodiments, hypergraph search system 210 generates the hypergraph 270 from a portion of a knowledge graph 260 (e.g., depending on the entities in the search request 240). In certain embodiments, the hypergraph search system 210 generates the hypergraph 270 by identifying portions of multiple knowledge graphs 260 and linking the portions of the multiple knowledge graphs 260 together. FIG. 3 illustrates an example of an information source 300 (e.g., a document) in accordance with certain embodiments. In the information source 300, the types of entities include: authors, dopant concentration, leakage current, dialectric thickness, top layer, and bottom layer. As an example, author is an entity type and Albert Einstein is a named entity belonging to the author entity type. The hypergraph search system 210 identifies logical coherence between the entities in the information source 300.

The hypergraph search system 210 is able to process search requests 240, such as the following with reference to a semiconductor:

Identify (top/bottom/dielectric) layers in a device stack.
Find layer characteristics (thickness) and method information (annealing temperature).
Describe overall device performance (dielectric constant).
Find dopants (with concentration) and their precursors, if present.

The hypergraph search system 210 is able to access information scattered across sections in a document and establish relationships between entities and facts found in different parts of the document. With this logical coherence, the hypergraph search system 210 identifies deeper insights.

The hypergraph search system 210 provides a protocol for extracting coherent information (e.g., entities and/or relationships between the entities) from an information source 220a . . . 220n. Through this protocol, the hypergraph search system 210 predicts high quality hyperedges in a hypergraph 270, via a scoring system, which allows coherent information extraction.

Figure 4:
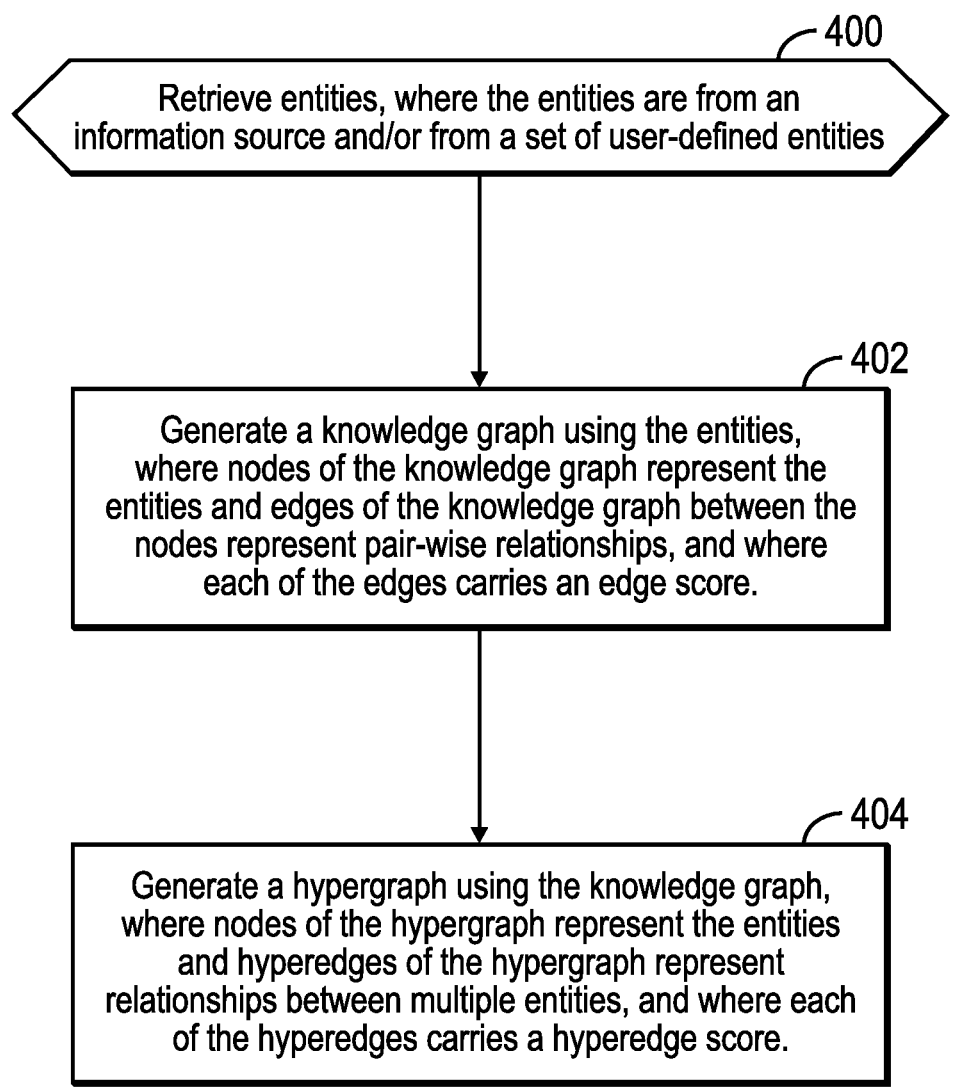
FIG. 4 illustrates, in a flowchart, operations for generating a hypergraph in accordance with certain embodiments.

FIG. 4 illustrates, in a flowchart, operations for generating a hypergraph 270 in accordance with certain embodiments. Control begins at block 400 with the hypergraph search system 210 retrieving entities, where the entities are from an information source 220a . . . 220n and/or from a set of user-defined entities 230. In certain embodiments, the information source 220a . . . 220n has been annotated, via named entity recognition, resulting in the entities that are then retrieved. In certain embodiments, the user-defined entities 230 are optional.

In block 402, the hypergraph search system 210 generates a knowledge graph 260 using the entities (the entities from the information source 220a . . . 220n and any user-defined entities 230 that have been retrieved). Nodes of the knowledge graph 260 represent the entities and edges of the knowledge graph 260 between the nodes represent pair-wise relationships. Each of the edges carries an edge score (i.e., a weight). In certain embodiments, each of the edges carries a probabilistic edge score that quantifies the degree of coherence between two entities (i.e., a pair of entities connected by an edge). In certain embodiments, the scoring metric is a function of proximity between locations of the entities in an information source 220a . . . 220n (e.g., document), a length of the information source 220a . . . 220n, an entity type (i.e., an entity category)), etc.

In block 404, the hypergraph search system 210 generates a hypergraph 270 using the knowledge graph 260. Nodes of the hypergraph 270 represent the entities and hyperedges of the hypergraph 270 represent the relationships between multiple entities. Each of the hyperedges carries a hyperedge score (i.e., a weight). In certain embodiments, a hyperedge of a hypergraph 270 is a set of edges of the knowledge graph 260. In certain embodiments, each of the hyperedges carries a probabilistic hyperedge score that quantifies the degree of coherence between multiple entities (i.e., three or more). In certain embodiments, the scoring metric is a function of proximity between locations of the entities in an information source 220a . . . 220n (e.g., document), a length of the information source 220a . . . 220n, an entity type (i.e., an entity category), etc. In certain embodiments, the hypergraph search system 210 inputs the edge scores to certain mathematical operations to generate the hyperedge scores. In certain embodiments, the mathematical operations may be multiplication or more complex combinations (e.g., multiplication but each edge score is raised to a different power depending on the entity type, etc.).

In certain embodiments, the hypergraph search system 210 traverses the knowledge graph 260 to identify which entities have a common relationship and uses that knowledge to generate the hyperedges. In addition to traversal, the hypergraph search system 210 looks at other signals to decide whether a hyperedge should be created. In certain embodiments, the hypergraph search system 210 (i) considers a candidate hyperedge, (ii) calculates a hyperedge score, (iii) keeps the candidate hyperedge if the hyperedge score is above a certain threshold score (and otherwise rejects this candidate hyperedge), and (iv) repeats with other candidates. In certain embodiments, this process may be sped up by heuristics and taking advantage of edge scores that are already known.

The hypergraph search system 210 provides a protocol for automated coherent knowledge extraction. Through automation, the hypergraph search system 210 avoids manual effort, which leads to fewer errors, time savings, and use of fewer financial resources. The hypergraph search system 210 extracts deeper semantic insights from information sources 220a . . . 220n.

Figure 5:
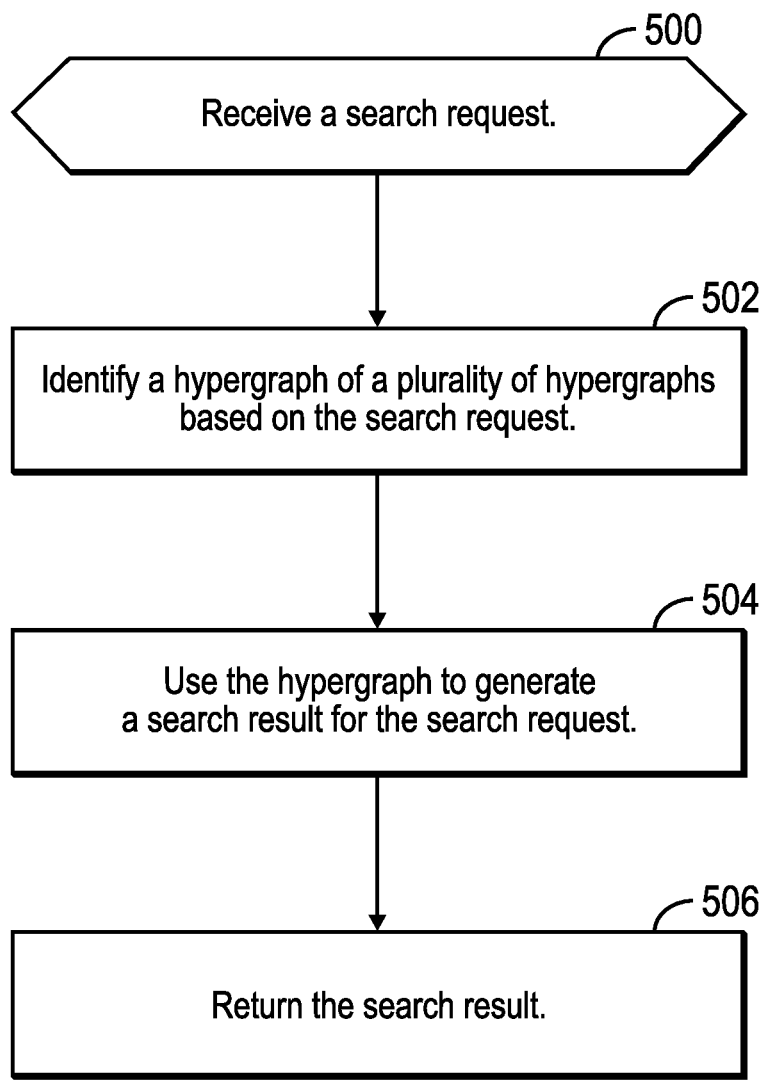
FIG. 5 illustrates, in a flowchart, operations for processing a search request using the hypergraph in accordance with certain embodiments.

FIG. 5 illustrates, in a flowchart, operations for processing a search request 240 using the hypergraph 270 in accordance with certain embodiments. Control begins at block 500 with the hypergraph search system 210 receives a search request

240. In block 502, the hypergraph search system 210 identifies a hypergraph 270 of a plurality of hypergraphs 270 based on the search request 240. In certain embodiments, the hypergraph search system 210 identifies the hypergraph 270 based on entities and relationships in the search request 240 that also exist in the identified hypergraph 270. In block 504, the hypergraph search system 210 uses the hypergraph 270 to generate a search result 280 for the search request 240. In certain embodiments, the hypergraph search system 210 uses the hypergraph 270 to generate the search result 280. In certain embodiments, the hypergraph search system 210 extracts the entities from the search request 240. Then, the hypergraph search system 210 uses these entities to filter (i.e., extract or identify) hyperedges from the entire set of hyperedges. The hypergraph search system 210 may return the filtered hyperedges as a search result 280 or may perform additional processing before returning the filtered hyperedges.

In block 506, the hypergraph search system 210 returns the search result 280 in response to the search request 240.

Figure 6:
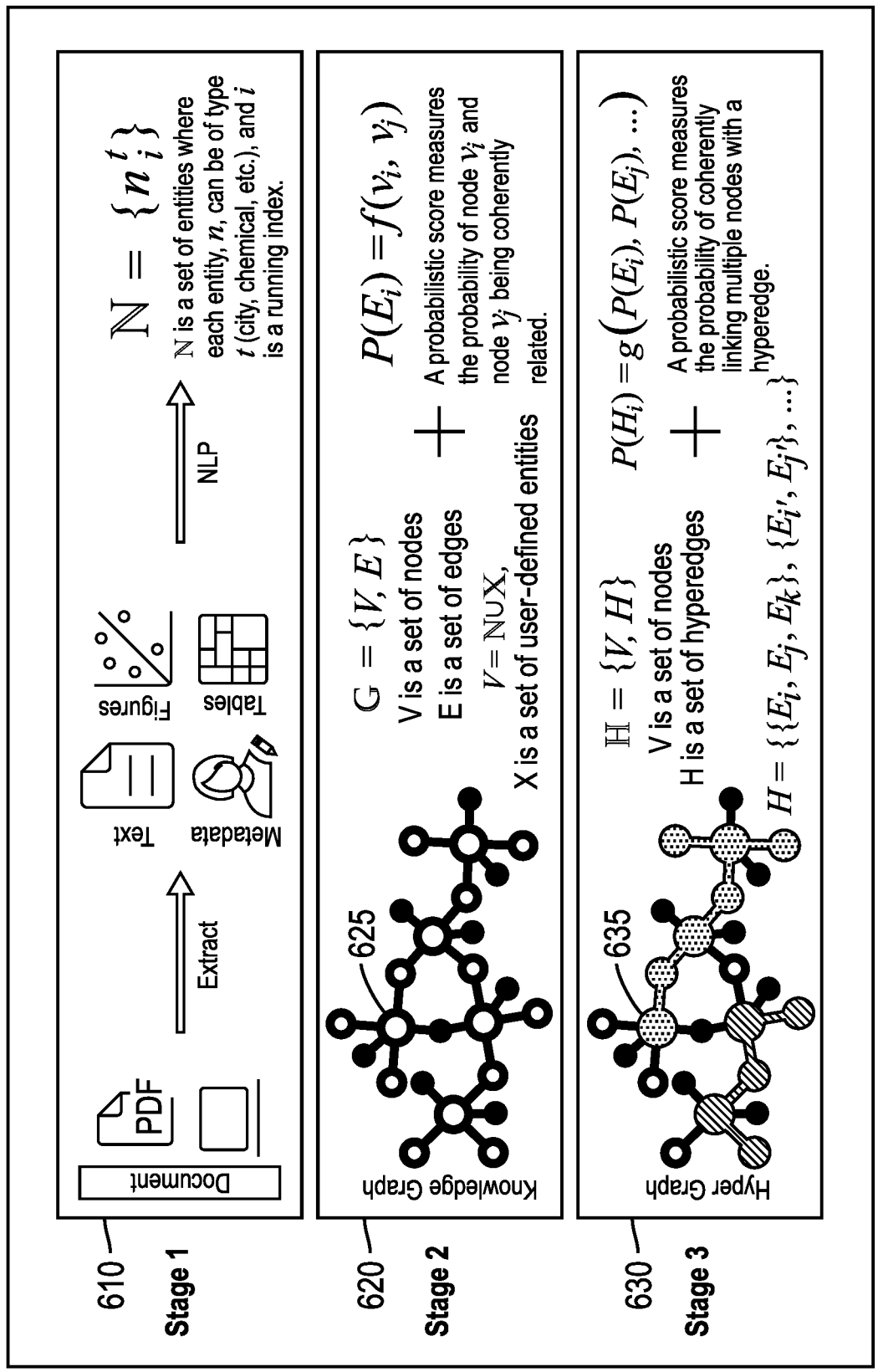
FIG. 6 illustrates stages of processing in accordance with certain embodiments.

FIG. 6 illustrates stages of processing in accordance with certain embodiments. In Stage 1 610, the hypergraph search system 210 extracts text, metadata, references, footnotes, appendices, figures, tables, etc. from the document (e.g., a web page). The hypergraph search system 210 uses Natural Language Processing (NLP) to identify a set of entities, where each entity n is of type t.

In Stage 2 620, the hypergraph search system 210 generates a knowledge graph 625 with nodes, edges, and edge scores. For the knowledge graph 625, the set of nodes may include nodes representing the set of entities identified in Stage 1 610 and may include nodes representing user-defined entities. For the knowledge graph 625, the set of edges represents pair-wise relationships. In addition, the hypergraph search system 210 uses a probabilistic function $P(E_i)$ to generate a probabilistic edge score for each pair of nodes that measures the probability that node $v_i$ and node $v_j$ are coherently related. In stage 3 630, the hypergraph search system 210 generates a hypergraph 635 with nodes hyperedges, and hyperedge scores. For the hypergraph 635, the nodes (representing the entities) are the nodes found in the knowledge graph 625, and the hyperedges represent relationships between multiple entities. In addition, the hypergraph search system 210 uses a probabilistic function P (Hi) to generate a probabilistic hyperedge score that measures the probability of coherently linking multiple nodes with a hyperedge.

Figure 7A:
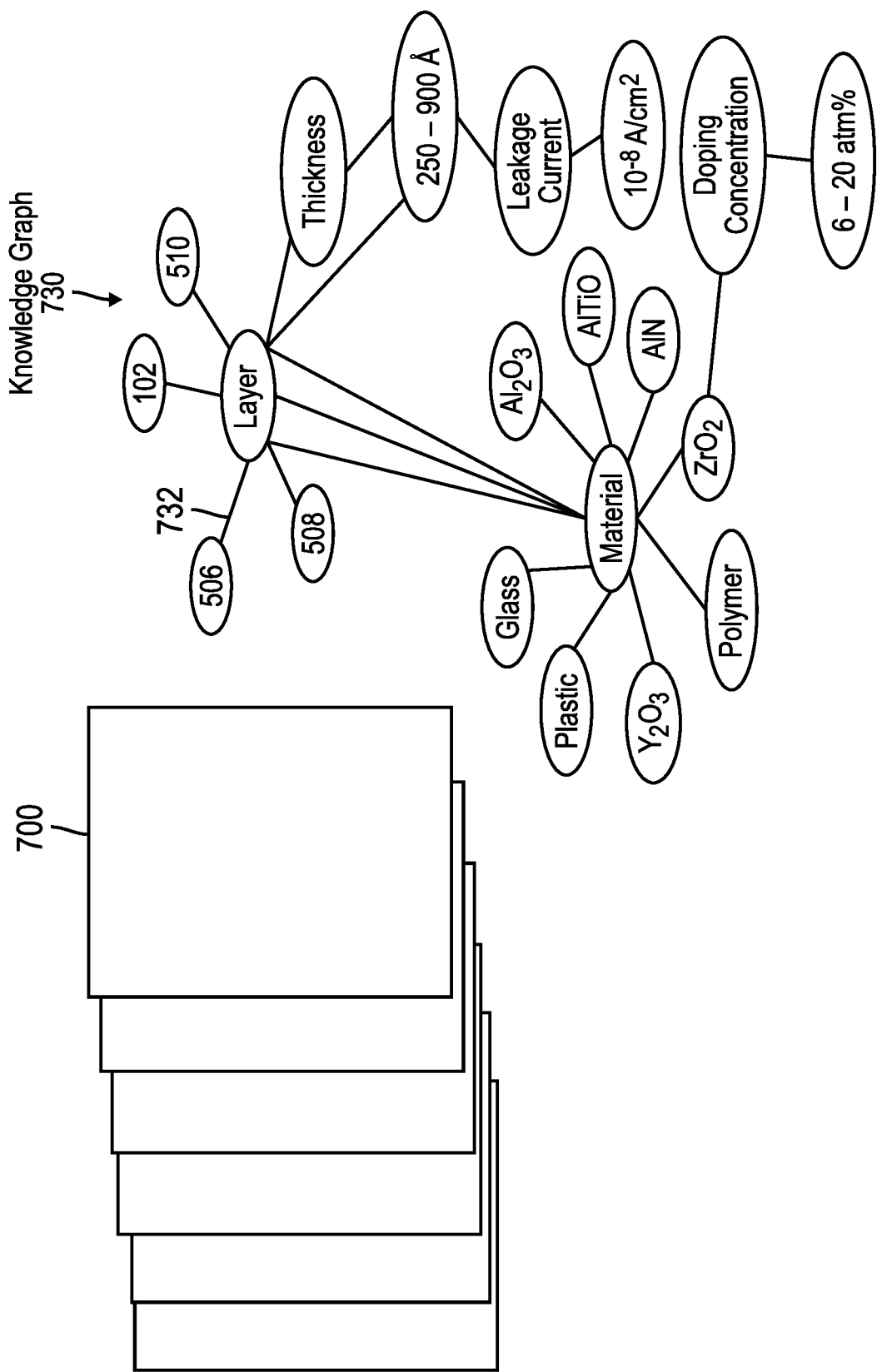
FIGS. 7A and 7B illustrate an example of a hypergraph generated from a knowledge graph in accordance with certain embodiments.
Figure 7B:
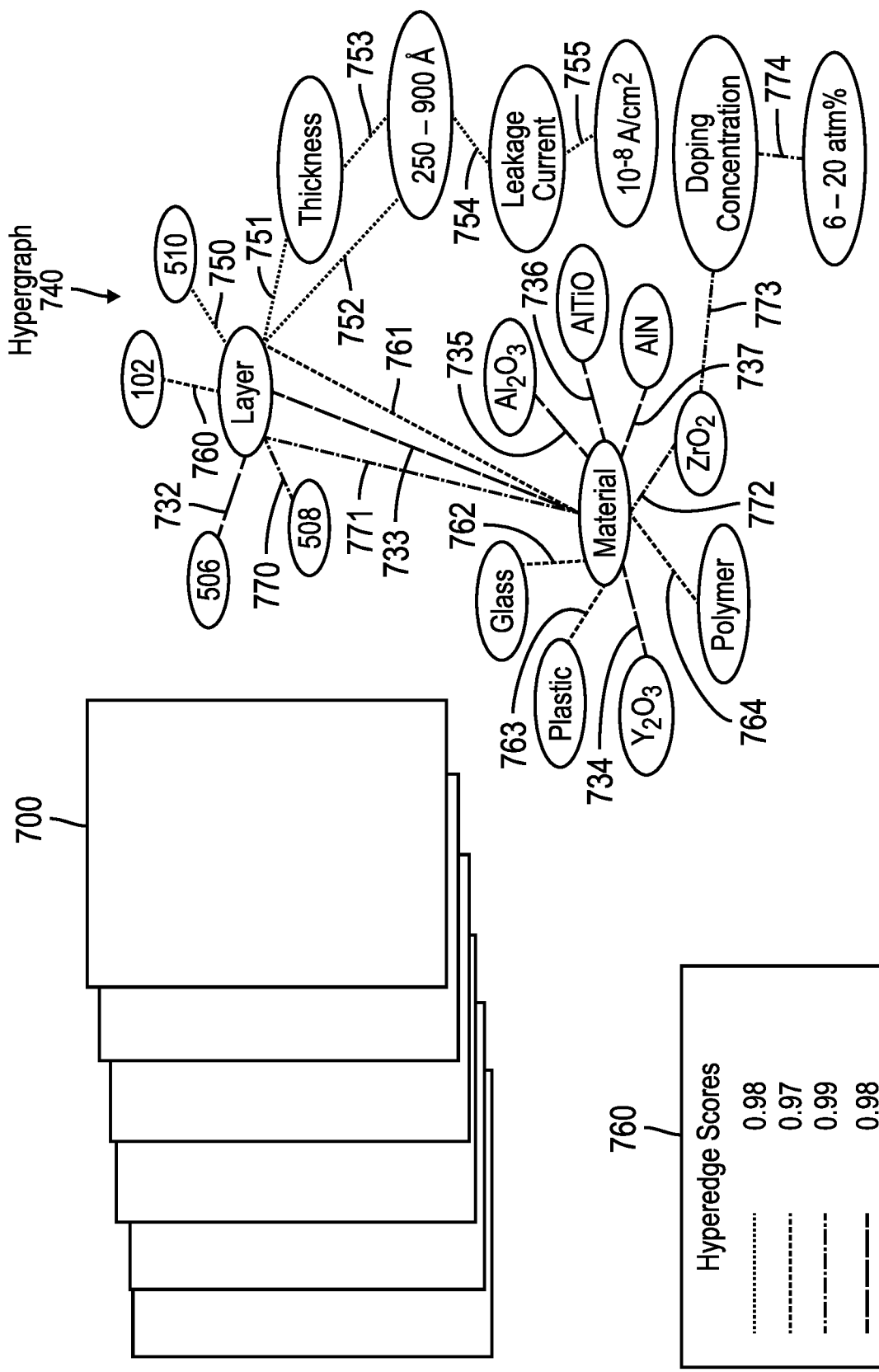

FIGS. 7A and 7B illustrate an example of a hypergraph 740 generated from a knowledge graph 730 in accordance with certain embodiments. In FIG. 7A, the hypergraph search system 210 obtains entities from the document 700 and generates the knowledge graph 730. The hypergraph search system 210 may perform edge scoring using proximity, entity type, dilution, Term Frequency-Inverse Document Frequency (TF-IDF), etc. Then, the edges of the knowledge graph 730 are associated with edge scores based on pairs of entities. For example, the edge score for edge 732 indicates the probability that layer and thickness are coherently related.

In FIG. 7B, the hypergraph search system 210 generates a hypergraph 740 from the knowledge graph 730. The hypergraph 740 has the same nodes and edges as the knowledge graph 730 in this example. There are four hyperedges in FIG. 7B: hyperedge 750, 751, 752, 753, 754, 755 (with a hyperedge score of 0.98), hyperedge 760, 761, 762, 764 (with a hyperedge score of 0.97), hyperedge 770, 771, 772, 773, 774 (with a hyperedge score of 0.99), and hyperedge 732, 733, 734, 735, 736, 737 (with a hyperedge core of 0.98).

The hyperedges of the hypergraph 740 are associated with the hyperedge scores based on multiple (3 or more) entities. For example, the hyperedge score of 0.98 for hyperedge 750, 751, 752, 753, 754, 755 indicates the probability that layer, 510, thickness, 250-900A, leakage current, and $10^{-8}$ A/cm$^2$ are coherently related.

In certain embodiments, multiple edges of the knowledge graph form one hyperedge. In certain embodiments, the hyperedge score for a hyperedge is based on applying a mathematical operation to the edge score of each edge forming the hyperedge. In certain embodiments, a particular edge may be part of multiple hyperedges.

Figure 8:
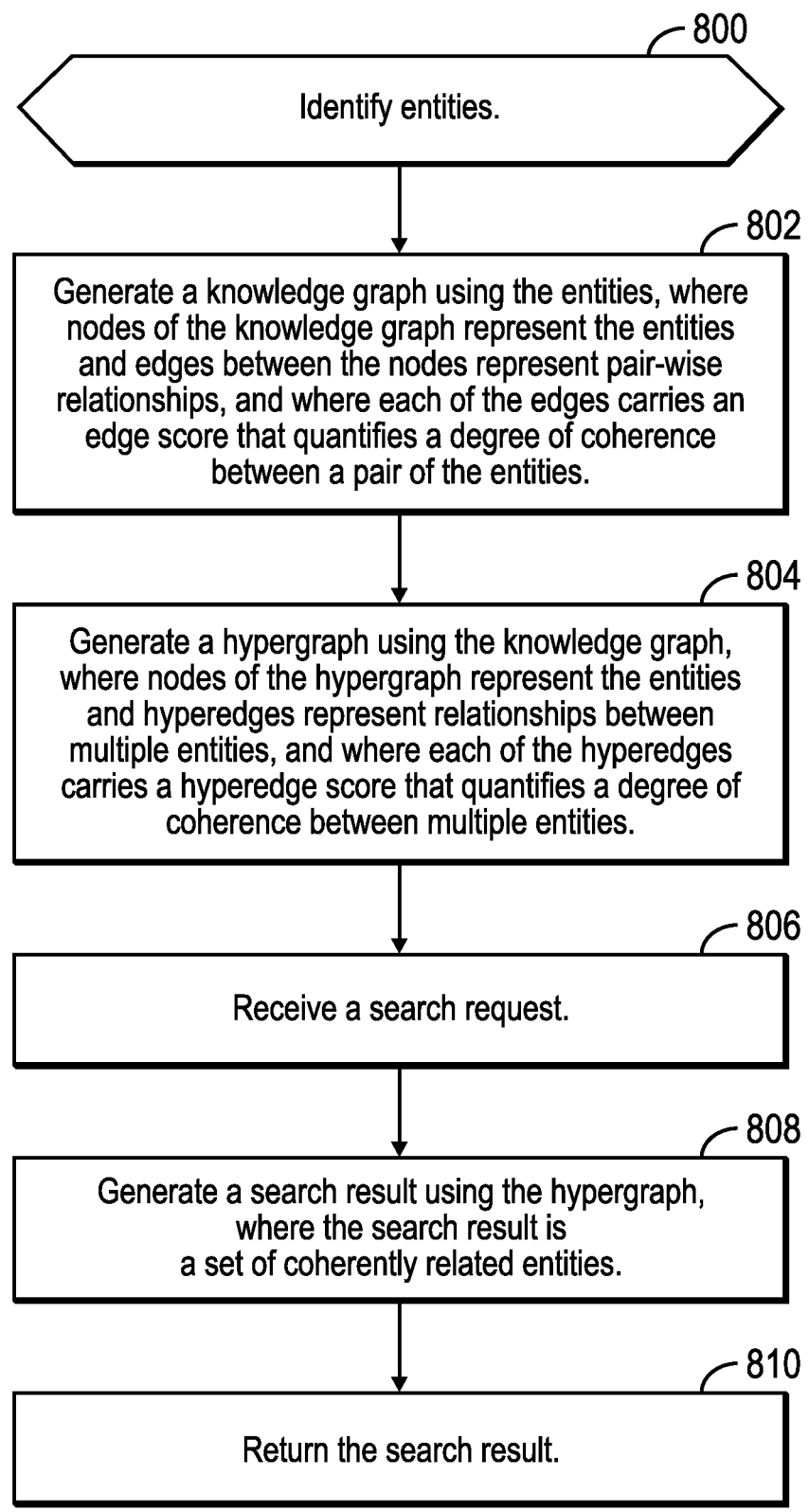
FIG. 8 illustrates, in a flowchart, operations for performing a search using a hypergraph in accordance with certain embodiments.

FIG. 8 illustrates, in a flowchart, operations for performing a search using a hypergraph 270 in accordance with certain embodiments. Control begins at block 800 with the hypergraph search system 210 identifying entities. In block 802, the hypergraph search system 210 generates a knowledge graph 260 using the entities, where nodes of the knowledge graph 260 represent the entities and edges between the nodes represent pair-wise relationships, and where each of the edges carries an edge score that quantifies a degree of coherence between a pair of the entities. In block 804, the hypergraph search system 210 generates a hypergraph 270 using the knowledge graph 260, where nodes of the hypergraph 270 represent the entities and hyperedges represent relationships between multiple entities, and where each of the hyperedges carries a hyperedge score that quantifies a degree of coherence between multiple entities.

In block 806, the hypergraph search system 210 receives a search request 240. In block 808, the hypergraph search system 210 generates a search result 280 using the hypergraph 270, where the search result 280 is a set of coherently related entities. In block 810, the hypergraph search system 210 returns the search result 280.

Thus, in certain embodiments, the hypergraph search system 210 provides a technique for extracting coherent information from an information source 220a . . . 220n by: generating, by annotating an information source 220a . . . 220n via named entity recognition, a set of entities. The hypergraph search system 210 generates, using the set of entities, a knowledge graph 260 consisting of nodes and edges, where the edges represent pair-wise relationships between the nodes, and where each of the edges has an associated edge score (i.e., a probabilistic weight). The hypergraph search system 210 generates, using the knowledge graph 260, a hypergraph 270 consisting of the nodes and hyperedges, where the hyperedges represent relationships between multiple nodes, and where each of the hyperedges has an associated hyperedge score (i.e., a probabilistic weight). The hypergraph search system 210 filters, from the hypergraph 270, a set of hyperedges to obtain coherent information from the information source 220a . . . 220n. The filtering may include comparing a hyperedge score with a certain threshold score.

Instead of just extracting pair-wise relationships, the hypergraph search system 210 extract entities (from a page, a paragraph, a sentence, a table, a figure, etc.) and provide coherent information linking multiple entities (from the page, the paragraph, the sentence, the table, the figure, etc.) from an entire document.

In certain embodiments, the hypergraph search system 210 provides automated coherent knowledge extraction. The hypergraph search system 210 provides efficient, automatic entity annotations and relationship extraction, thus avoiding manual effort that is time consuming and expensive. The hypergraph search system 210 also provides efficient, automatic linking of information.

In certain embodiments, the hypergraph search system 210 uses natural language processing (including named entity recognition and user-defined entities 230) to generate entities, creates a knowledge graph 260 with the entities, generates a hypergraph 270 from the knowledge graph 260, generates probabilistic scores/weights associated with edges of the knowledge graph 260 and hyperedges of the hypergraph 270, and extracts coherent information from the hypergraph 270.

In certain embodiments, the hypergraph search system 210 provides coherence between entities using a hypergraph 270. First, an information source 220a . . . 220n (document) is annotated, via Named Entity Recognition (NER), resulting in a set of isolated entities. At this step, the user also may also provide user-defined entities 230 that are added to the set of isolated entities found via NER. The hypergraph search system 210 creates a knowledge graph 260, where the nodes are the entities and edges between the nodes are pair-wise relationships. Each edge carries a probabilistic score/weight which quantifies the degree of coherence between two entities. The hypergraph search system 210 creates a hypergraph 270 consisting of nodes (which are the entities) and hyperedges, using pair-wise relationships, between multiple entities. Each hyperedge carries a probabilistic score/weight which quantifies the degree of coherence between multiple entities. The hypergraph search system 210 identifies the high-scoring hyperedges to extract coherent entities.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

In the described embodiment, variables a, b, c, i, n, m, p, r, etc., when used with different elements may denote a same or different instance of that element.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended. The foregoing description provides examples of embodiments of the invention, and variations and substitutions may be made in other embodiments.

What is claimed is:

1. A computer-implemented method, comprising operations for:
    identifying entities;
    generating a knowledge graph using the entities, wherein nodes of the knowledge graph represent the entities, wherein edges between the nodes represent pair-wise relationships, and wherein each of the edges carries an edge score that quantifies a degree of coherence between a pair of the entities;
    generating a hypergraph by traversing the knowledge graph, wherein nodes of the hypergraph represent the entities, wherein hyperedges represent relationships between multiple entities, wherein each of the hyperedges carries a hyperedge score that quantifies a degree of coherence between the multiple entities, and wherein each of the hyperedges comprises a set of edges of the knowledge graph;
    receiving a search request;
    generating a search result using the hypergraph, wherein the search result comprises coherently related entities comprising the entities from at least one hyperedge of the hyperedges; and
    returning the search result.

2. The computer-implemented method of claim 1, wherein identifying the entities further comprises operations for:
    performing named entity recognition to identify one or more of the entities in an information source.

3. The computer-implemented method of claim 1, wherein the entities comprise one or more user-defined entities.

4. The computer-implemented method of claim 1, wherein the edge score of a particular edge of the edges comprises a probabilistic edge score that is a function of proximity between locations of the entities in an information source, a length of the information source, and an entity type.

5. The computer-implemented method of claim 1, wherein the hyperedge score of a particular hyperedge of the hyperedges comprises a probabilistic hyperedge score that is based on the edge score of each edge that is part of the particular hyperedge.

6. The computer-implemented method of claim 1, wherein the coherently related entities comprise entities of an information source that are located in different portions of the information source.

7. The computer-implemented method of claim 1, further comprising operations for:
identifying the hypergraph from a plurality of hypergraphs based on the search request.

8. A computer program product, the computer program product comprising a computer readable storage medium having program instructions embodied therewith, the program instructions executable by a processor to cause the processor to perform operations for:
identifying entities;
generating a knowledge graph using the entities, wherein nodes of the knowledge graph represent the entities, wherein edges between the nodes represent pair-wise relationships, and wherein each of the edges carries an edge score that quantifies a degree of coherence between a pair of the entities;
generating a hypergraph by traversing the knowledge graph, wherein nodes of the hypergraph represent the entities, wherein hyperedges represent relationships between multiple entities, wherein each of the hyperedges carries a hyperedge score that quantifies a degree of coherence between the multiple entities, and wherein each of the hyperedges comprises a set of edges of the knowledge graph;
receiving a search request;
generating a search result using the hypergraph, wherein the search result comprises coherently related entities comprising the entities from at least one hyperedge of the hyperedges; and
returning the search result.

9. The computer program product of claim 8, wherein, for identifying the entities, the program instructions are executable by the processor to cause the processor to further perform:
performing named entity recognition to identify one or more of the entities in an information source.

10. The computer program product of claim 8, wherein the entities comprise one or more user-defined entities.

11. The computer program product of claim 8, wherein the edge score of a particular edge of the edges comprises a probabilistic edge score that is a function of proximity between locations of the entities in an information source, a length of the information source, and an entity type.

12. The computer program product of claim 8, wherein the hyperedge score of a particular hyperedge of the hyperedges comprises a probabilistic hyperedge score that is based on the edge score of each edge that is part of the particular hyperedge.

13. The computer program product of claim 8, wherein the coherently related entities comprise entities of an information source that are located in different portions of the information source.

14. The computer program product of claim 8, wherein the program instructions are executable by the processor to cause the processor to further perform:
identifying the hypergraph from a plurality of hypergraphs based on the search request.

15. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more computer-readable memories, to perform operations comprising:
identifying entities;
generating a knowledge graph using the entities, wherein nodes of the knowledge graph represent the entities, wherein edges between the nodes represent pair-wise relationships, and wherein each of the edges carries an edge score that quantifies a degree of coherence between a pair of the entities;
generating a hypergraph by traversing the knowledge graph, wherein nodes of the hypergraph represent the entities, wherein hyperedges represent relationships between multiple entities, wherein each of the hyperedges carries a hyperedge score that quantifies a degree of coherence between the multiple entities, and wherein each of the hyperedges comprises a set of edges of the knowledge graph;
receiving a search request;
generating a search result using the hypergraph, wherein the search result comprises coherently related entities comprising the entities from at least one hyperedge of the hyperedges; and
returning the search result.

16. The computer system of claim 15, wherein, for identifying the entities, the program instructions further perform operations comprising:
performing named entity recognition to identify one or more of the entities in an information source.

17. The computer system of claim 15, wherein the entities comprise one or more user-defined entities.

18. The computer system of claim 15, wherein the edge score of a particular edge of the edges comprises a probabilistic edge score that is a function of proximity between locations of the entities in an information source, a length of the information source, and an entity type.

19. The computer system of claim 15, wherein the hyperedge score of a particular hyperedge of the hyperedges comprises a probabilistic hyperedge score that is based on the edge score of each edge that is part of the particular hyperedge.

20. The computer system of claim 15, wherein the coherently related entities comprise entities of an information source that are located in different portions of the information source.

* * * * *